Oct. 22, 1974     E. G. SUNDBERG     3,843,412
GALVANIC ELECTRODE COVER METHOD
Original Filed Sept. 5, 1968     2 Sheets-Sheet 1
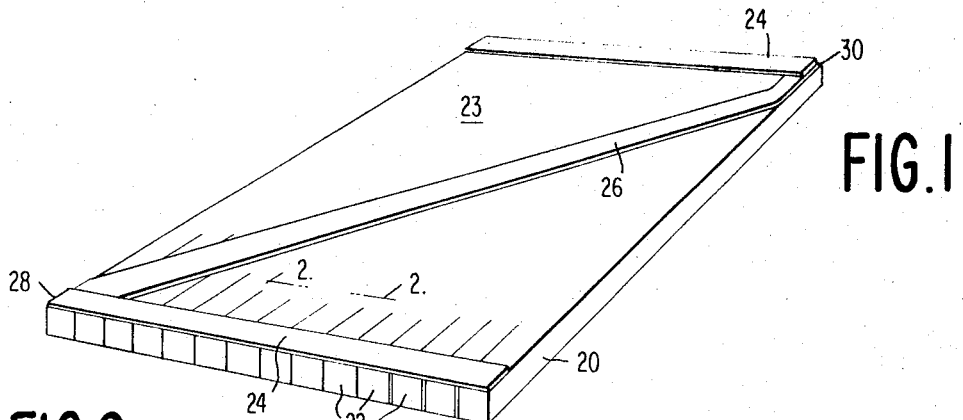
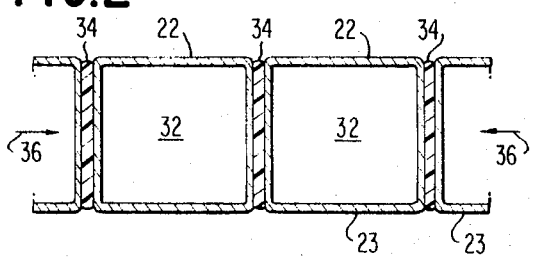
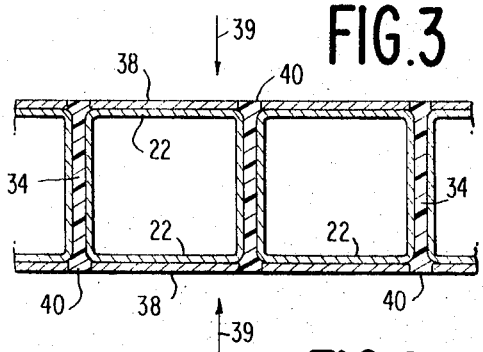
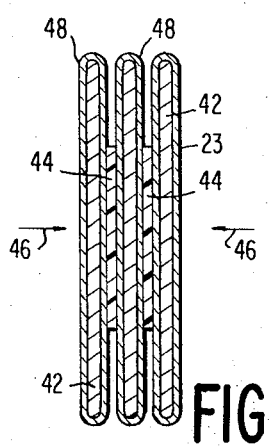
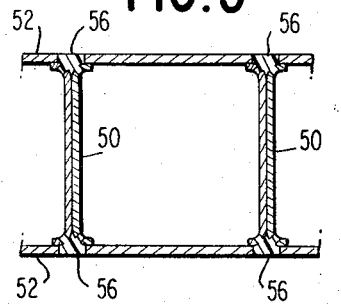
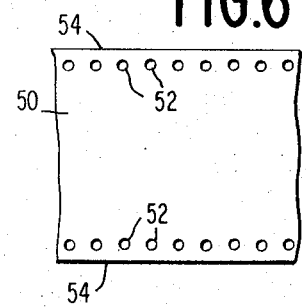
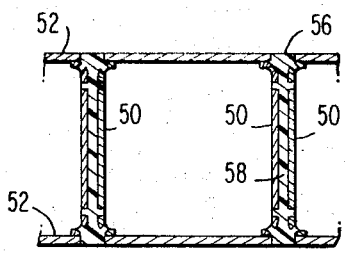
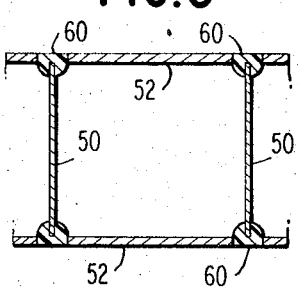
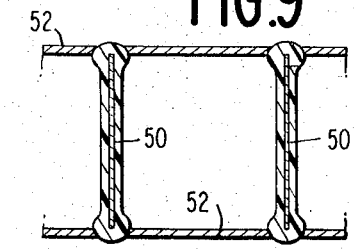
INVENTOR
ERIK G. SUNDBERG
BY Burns, Doane, Benedict, Swecker & Mathis
ATTORNEYS Oct. 22, 1974  E. G. SUNDBERG  3,843,412
GALVANIC ELECTRODE COVER METHOD
Original Filed Sept. 5, 1968  2 Sheets-Sheet 2
FIG.10
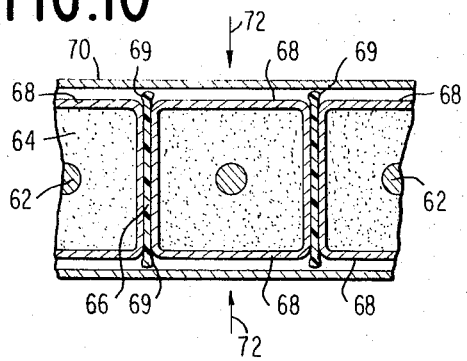
FIG.11
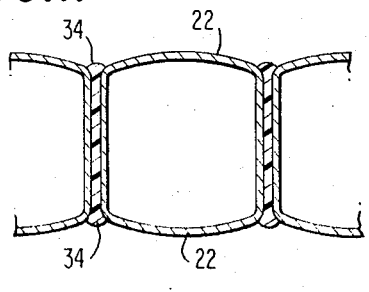
FIG.12
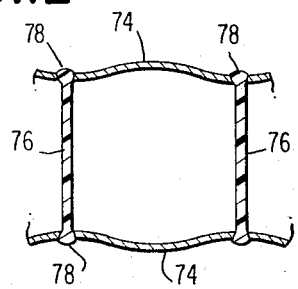
FIG.13
FIG.14
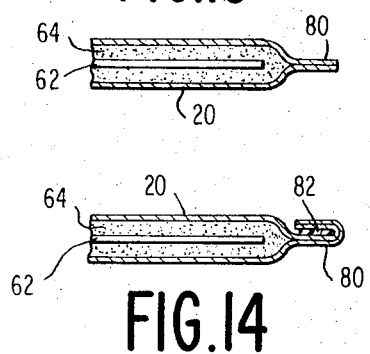
FIG.15
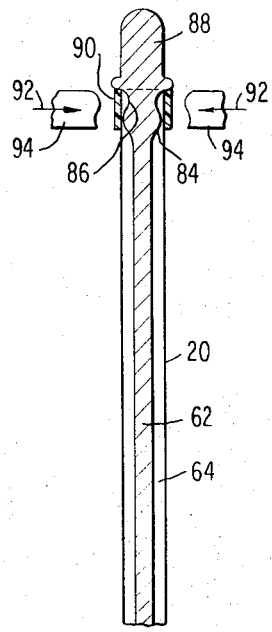
FIG.16
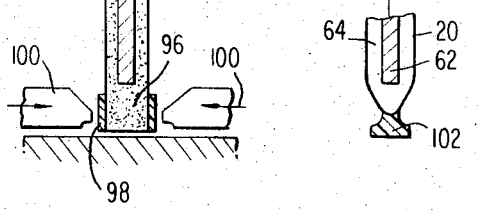
INVENTOR
ERIK G. SUNDBERG
BY  Burns, Doane, Benedict, Swecker & Mathis
ATTORNEYS United States Patent Office 3,843,412
Patented Oct. 22, 1974

3,843,412
GALVANIC ELECTRODE COVER METHOD
Erik Gustav Sundberg, Nol, Sweden, assignor to
Aktiebolaget Tudor, Stockholm, Sweden
Continuation of application Ser. No. 757,622, Sept. 5,
1968. This application Apr. 7, 1970, Ser. No. 24,419
Claims priority, application Sweden, Sept. 22, 1967,
13,102/67
Int. Cl. H01m 35/04
U.S. Cl. 136—55                                    3 Claims

ABSTRACT OF THE DISCLOSURE

A unitary cover for a plural active element electrode assembly and methods for making the same.

BACKGROUND OF THE INVENTION

This application is a continuation of Ser. No. 757,622 filed Sept. 5, 1968, now abandoned.

The present invention concerns electrodes for galvanic elements, especially for electric storage batteries of the lead-acid type with positive tubular plates consisting mainly of a plurality of rods of conductive material connected at one or both ends by suitable connections, wherein each individual rod is in contact with active material and the active material is surrounded with a novel cover and casing. The cover or casing is customarily made of electrically insulating material that is resistant to the electrolyte and to the reactions in the electrolytic cell, but which permits the passage of electrolyte while retaining the active material in place.

It has been the prior practice to make such tubular covers from a fabric of glass wool or equivalent fiber material enclosed by an outer thin walled perforated tube of a plastic foil. It has been proposed, first to place active material in paste form on the conductive rods of the electrode and, after the paste has hardened, to wind a fibrous cover in the form of a band or spiral around the paste coated electrode rods.

Prior art covers have also been made of a woven or plaited hose of fibrous material treated to maintain its tubular form and to be self-supporting. Such covers have been made of a double-woven cloth of a special kind known as a "cartridge-belt weave." The material used in electrode coverings of this type is usually polyester fiber or a mixture thereof with the thermoplastic fiber, e.g., polyvinylchloride yarn. By threading the covering material onto mandrels disposed in a spaced parallel relation, and then sintering the thermoplastic fibers together between the mandrels, passages are formed in the fabric cover which retains its shape after removal of the mandrels.

According to another prior art suggestion, two fibrous mats or woven fabrics of insulating and acid-resistant material are placed in an over-lying relationship to each other and secured to one another by means of spaced, parallel seams. Passages are thus produced in a cover which can be made rigid by the method outlined above. If the fibrous layers are made solely of thermoplastics, the seaming may, of course, be effected by the application of heat and pressure.

Multiple rod covers so constructed have the disadvantage of inefficiently using the space avaliable in the galvanic cell in that the expansion in volume of the active composition which occurs during use of the batter, results in a substantially circular cross section, even if initially produced with a rectangular cross section.

According to a more recent suggestion, the covers may be impregnated with an acid-resistant impregnating agent, such as phenol resin or epoxy resin, to render it self-supporting. These known constructions have proven unsatisfactory in that they either fail to retain their shape or are impregnated to such an extent that much of the required porosity is lost. The result is that the active material is not used effectively and the fibrous material becomes brittle and fragile.

The electrode according to the present invention is characterized in that the covers for all the conductive rods or elements which comprise the electrode assembly are produced as a single unit. Such a cover may consist of a number of tubes corresponding to the number of electrode rods. These tubes may be substantially square or rectangular in cross section to facilitate a side-by-side arrangement and thus maximum utilization of cell capacity. These tubes may be lined on the inside with a fabric or a felt of glass wool and may in themselves be a thin walled, perforated foil of a synthetic material such as polyvinylchloride or polyester.

The cover of the present invention has been found to have significant advantages when compared to the previously known covers. It has been found that the capacity of the electrolytic cell is higher with the use of electrodes according to the present invention for the reason that the cover requires comparatively very little space in itself, thus allowing a larger portion of the available space to be occupied by active material. The cover is furthermore simpler to make than hitherto known multiple rod electrode covers, is simpler to place on the electrode, and effectively prevents the disassociation of active material from the rods.

THE DRAWINGS

FIG. 1 is a perspective view of one embodiment of the multiple rod cover of the electrode of the present invention;

FIG. 2 is a section taken along lines 2—2 of FIG. 1 with the forming mandrels in place;

FIG. 3 is the section of FIG. 2 with an additional reinforcing mat in the plane of the electrode assembly and with the mandrels removed;

FIG. 4 illustrates a second method of producing the electrode covers of the present invention;

FIGS. 5 through 8, inclusive, illustrate various other embodiments of a portion of the cover of the invention in cross section;

FIG. 9 is a portion of an edge perforated transverse separator;

FIG. 10 is a cross section of an electrode according to the invention, showing a reinforcing mat spaced from but secured thereto by the application of heat;

FIGS. 11 and 12 illustrate different cross-sectional configurations, FIG. 11 in addition illustrates a modification in which the fibrous walls are secured together at spaced intervals by solid walls of a thermoplastic material introduced by the application of heat and pressure into the fibrous mats to form the cover;

FIGS. 13 and 14 are views of the electrode in longitudinal section illustrating a method of securing the bottom ends of the cover after the insertion thereof over the multiple rods to form a supporting edge; and FIG. 15 and 16 are longitudinal sectional views of a single electrode rod illustrating a second method of closing the ends of the cover about the rod.

THE DETAILED DESCRIPTION

Referring now to FIG. 1, a completed electrode cover 20 is illustrated. The cover 20 comprises a plurality of longitudinal section 22 of substantially rectangular cross section. These sections 22 are coextensive and disposed in a side-by-side relationship. Upper and lower planar surfaces 23 are thus formed parallel to the plane of the multiple rod electrode over which the cover is to be inserted.

A reinforcing strip 24 may be secured to one of the planar surfaces 23 along both ends thereof. A third reinforcing strip 26 running diagonally across the cover 20 from the lower left corner 28 thereof to the upper right corner 30 may also be provided. The reinforcing strips 24 and 26 may, of course, be deleted or supplemented by other reinforcing strips (not shown) as necessary to achieve the desired rigidity of the cover 20. The rigidity of the cover necessary for the proper functioning thereof will, of course, vary with the length and number of the rods of the electrode for which the cover 20 is intended.

FIG. 2 is a partial section of the cover 20 of FIG. 1 with the substantially square cross section mandrels 32 utilized in the construction of the cover 20 shown in place in each of the sections 22, thus formed. The cover 20 may be formed by the placing of a braided fiberglass sleeving 22 on each of the mandrels 32. Disposed between adjacent of the sleeving 22 covered mandrels 32, and coextensive therewith, may be placed strips of polyethylene 34.

Adjacent of the sleevings 23 may be secured together by the heating of the mandrels 32 by any suitable means and the application of pressure across the width of the cover 20 in the direction indicated by the arrows 36. The plasticizing of the polyethylene by the application of heat and pressure causes the same to enter the fiberglass sleevings 23 on both sides thereof. The result is a wall of fiberglass reinforced polyethylene. The reinforced wall thus formed may be sufficiently rigid for the electrode cover 20 to retain its shape without the need for further impregnation of the sleevings 23.

In the section illustrated in FIG. 3, further layer 38 of fiberglass has been placed in an overlying relationship along with planar surfaces 23 of the cover 20. The application of pressure in the directions indicated by the arrows 39 to the layers 38 over the entire area of the planar surfaces 23 during the cover 20 forming process, i.e., the reinforcing of the polyethylene strips 34 of FIG. 2 with the fiberglass of the sleevings 22, also serves to impregnate the layers 38 in an area 40 along the lines of the juncture of adjacent sleevings 23.

FIG. 4 illustrates a second method of producing the cover 20 of FIG. 1. In this method, the glass fiber sleevings 22 are placed on substantially planar formers or mandrels 42 and the mandrels 42 disposed in a side-by-side relation. A polyethylene strip 44 may then be disposed between adjacent of the sleeving 22 covered formers 42.

The width of the strips 44 may be substantially one half the width of the formers 42. The application of heat and pressure in the direction indicated by the arrows 46 after the centering of the strips 44 with respect to the width of the formers 42 secures adjacent of the sleeving 22 together by the penetration of the polyethylene into the fiberglass sleeving 22 as earlier described. After removal of the mandrels 42, the cover 20 may then be transversely expanded so that the loops 48 of the sleevings 22 become coplanar to form the planar surfaces 23 of the cover 20. The sections 22 of the cover 20 thus assume the substantially square cross section illustrated in FIGS. 1, 2, and 3.

It is to be understood that some other fibrous, acid resistant, insulating material may be substituted for the fiberglass in the sleevings 22 described. For example, suitable polyesters or polypropylene may be substituted.

Instead of polyethylene, the strips 44 may likewise be composed of some other thermoplastic material such as polypropylene or polyvinylchloride, although polyvinylchloride may be less satisfactory due to the evolution of chlorine.

Instead of a thermoplastic, other resins may be applied in liquid or doughy form. Epoxy resins are examples of resins of this type.

In the section illustrated in FIG. 5, the transverse separators 50 between the planar surfaces 52 are made of an acid resistant insulating sheet or foil of polyester. The sheet 50 of polyester may have, as indicated in FIG. 6, a plurality of perforations 52 along its edges 54 to facilitate the securing thereof to the planar surfaces 52 in the area 56 of FIG. 5 by impregnation by a polyethylene filament or the like.

A variation in the embodiment of FIG. 5 is illustrated in FIG. 7 wherein an intermediate layer 58 of polyethylene is disposed between adjacent of the separators 50. Additional rigidity of the separator 50 may be obtained in this manner.

A further embodiment is illustrated in FIG. 8 wherein the separator 50 comprises a single layer of foil or film and is secured to the planar surface 52 in the areas 60 by means of polyethylene or some other appropriate material. The areas 60 may thus be coextensive with the cover 20 and form spaced parallel lines in the surfaces 23.

As illustrated in FIG. 9, the separators 50 between the parallel planar surfaces 52 may be reinforced by a sheet or film of polyester which does not deform during the forming of the cover 20 by the application of heat and pressure sufficient to secure the bonding of the separators 50 to the planar surfaces 52.

Referring now to FIG. 10, a further embodiment of the cover of the present invention is shown in a partial section of a completed electrode where the rods 62 are surrounded by active material 64. The separators 66 located between each of the adjacent sleevings 22 are coextensive with the length of the rods 62 of the electrode but extend transversely beyond the coplanar surfaces 68 of the sleevings 22 to form separator portions 69. Upon the application of heat and pressure as in the manner described in connection with FIG. 2, the fibers of the sleevings 22 are impregnated with the thermoplastic separator 66 to produce the relatively rigid transverse portions of the cover 20.

A further fibrous sheet 70 may be secured to each of the separator portions 69 of the separators 66 along the line formed by junction of the adjacent sleevings 22 by the application of heat and pressure in the direction indicated by the arrows 72. The outer layer 70 of fibrous material is thus maintained spaced apart from the coplanar surface 68 of the individual electrode rod 62 cover sections 22 by the separator portions 68. In this manner the access of liquid electrolyte to the active material 64 about the rods 62 is facilitated and the electrode cover 20 is strengthened at a minimum loss of space.

FIG. 11 illustrates a further embodiment of the present invention in which the cross section of the individual electrode rod cover manufactured by the process illustrated in FIGS. 2 or 4 is varied. In FIG. 11, the sleevings 22 are secured by means of impregnation by the thermoplastic layers 34. The variations in the cross section may occur as a result of the modifications in the shape of the mandrels 32 in FIG. 2 or the deforming of the sleeving 22 by the packing of excessive active material about the individual electrode rod.

The embodiment of FIG. 12 may be constructed in the manner of the embodiment of FIGS. 5 and 7–9. In FIG. 12 the substantially parallel fibrous sheets 74 are secured by parallel separators 76 by the application of heat and pressure to the portions 78 as earlier described. The undulations of the sheets 74 facilitate the access of the electrolyte to the active material.

After insertion of the cover 20 on the active material 64 coated rods 62, the ends of the planar sides of the cover may be crimped together as shown in FIG. 13 and welded by the application of heat to form a rigid bottom ridge 80. The crimped ends of the cover 20 may, as illustrated in FIG. 14, be folded over upon itself and reheated to increase the rigidity of the ridge 80. An optional reinforcing element 82 may be inserted between the folds of the ridge 80 if additional strength is desired.

Referring now to FIG. 15, a second method of closing the cover 22 about the active element 64 covered rod 62 is illustrated. In this method the rod 62 advantageously is shaped to provide an annular ridge 84 and groove 86 where connected to a top crossover conducting element 88. After the insertion of a reinforcing strip 90 on opposite sides of the cover 20 in proximity to the groove 86, heat and pressure may be applied thereto in the direction indicated by the arrows 92 by a pair of shaped dies 94. The resulting deformation of the reinforcing strips 84 conforms the cover 20 to the shape of the groove 86 behind the ridge 84. The active material 64 is thus effectively sealed about the rod 62 as illustrated in the finished electrode of FIG. 16.

With continued reference to FIGS. 15 and 16, the same method of sealing the lower ends 96 of the cover 20 may be employed. The thickness of the reinforcing inserts 98 and the shape of the dies 100 may be varied as desired to provide the rigid base 102 shown in FIG. 16.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. The method of making a cover for retaining active material on the respective rods of conductive material of a plural, parallel rod electrode for use in a storage battery having positive and negative electrodes and a liquid electrolyte comprising the steps of:
   (a) providing a plurality of like fibrous sleevings;
   (b) placing the sleevings under at least nominal tension on substantially flat mandrels;
   (c) alternating the sleeving covered mandrels with a electrolyte resistant synthetic resinous material in contact with the sleeving of the immediately adjacent mandrels, the material being substantially one half the width of the mandrels and transversely centered with respect thereto;
   (d) compressing the alternated sleeving covered mandrels and material while applying heat to secure adjacent ones of the sleevings to each other in the area of the resinous material by the impregnation of the sleevings with the material;
   (e) removing the mandrels from the secured sleevings; and
   (f) expanding the secured sleevings to form a plurality of tubes of substantially rectangular cross section, with the resinous material substantially coextensive with the width of the expanded electrode cover.

2. The method of making a cover for retaining active material on the respective rods of conductive material of a plural, parallel rod electrode for use in a storage battery having positive and negative electrodes and a liquid electrolyte comprising the steps of:
   (a) providing a plurality of like fibrous sleevings;
   (b) placing the sleevings on mandrels of substantially rectangular cross sections;
   (c) alternating the sleeving covered mandrels with a electrolyte resistant synthetic resinous material in contact with the sleeving of the immediately adjacent mandrels, the material being substantially the width of the mandrels and transversely centered with respect thereto;
   (d) compressing the alternated sleeving covered mandrels and material while applying heat to secured adjacent ones of the sleevings to each other in the area of the resinous material by the impregnation of the sleevings with material; and
   (e) removing the mandrels from the secured sleevings, whereby the resinous material is substantially coextensive with the width of the electrode cover.

3. The method of claim 2 including the further steps of:
   (f) placing the cover on a plural rod electrode;
   (g) filling the space between the cover and the electrode with an active material;
   (h) bending the extreme ends of the cover about an insert of thermoplastic material; and
   (i) applying sufficient heat and pressure to the ends of the cover to impregnate the cover with the material of the inserts whereby the ends of the cover are secured about the rods of the electrode to form a supporting edge.

References Cited
UNITED STATES PATENTS

| | | | |
|---|---|---|---|
| 2,343,970 | 3/1944 | Galloway | 136—147 |
| 2,937,221 | 5/1960 | Lindgren | 136—145 |
| 3,265,535 | 8/1966 | Sundberg | 136—26 |
| 3,266,935 | 8/1966 | Boriolo | 136—54 |
| 3,429,752 | 2/1969 | Sundberg | 136—147 |
| 3,503,807 | 3/1970 | Sundberg | 136—55 |

WINSTON A. DOUGLAS, Primary Examiner

C. F. LEFEVOUR, Assistant Examiner

U.S. Cl. X.R.

136—27